3,032,428
RADIATION SENSITIVE GLASS CONTAINING TRIVALENT CERIUM
Robert J. Ginther, Temple Hills, Md., assignor to the United States of America as represented by the Secretary of the Navy
No Drawing. Filed Apr. 27, 1959, Ser. No. 809,322
4 Claims. (Cl. 106—47)
(Granted under Title 35, U.S. Code (1952), sec. 266)

The invention described herein may be manufactured and used by or for the Government of the United States of America for governmental purposes without the payment of any royalties thereon or therefor.

The present invention relates to glass having the property of scintillating in response to nuclear radiation such as gamma rays and neutrons and useful as the radiation sensitive element or detector in scintillation counters.

Radiation detectors heretofore employed in scintillation counters have usually been either a crystal of organic or inorganic material or an organic plastic element. While an efficient conversion of the incident radiation to scintillations may be had with these previous detectors, the crystals employed have to be grown by time-consuming and expensive methods. Such crystals have been prepared, moreover, only in a very limited variety of shapes and sizes. Although the organic plastic type detector does not have the limitation of the crystal type as to shapes and sizes, the special processing of them has rendered them expensive.

It is an object of the present invention to provide new material for making radiation detectors for scintillation counters at lower cost than the prior art crystal and plastic type detectors. It is also an object to provide new glass which is capable of scintillating in response to gamma rays and to neutrons. It is a further object to provide glass of this kind which is easy to melt and cast.

I have found that the above and other objects can be accomplished by incorporating trivalent cerium in certain alkali-aluminoborate and alkali-aluminosilicoborate glasses hereinafter more fully described. The trivalent cerium activates the glasses to scintillate in response to gamma rays and to neutrons. The boron in the glasses is a neutron acceptor and through it the glasses are caused to scintillate in response to neutrons.

The new glasses of my invention contain trivalent cerium as cerous oxide, $Ce_2O_3$, an alkali oxide which may be sodium oxide or lithium oxide or a mixture of the same, boron oxide and alumina. Silica may be used to replace part of the boron oxide to form borosilicate glasses. Glass compositions in accordance with the invention and relative proportions of the components of the glasses are as follows:

| | Mols |
|---|---|
| $Na_2O$ | 1–0 |
| $Li_2O$ | 0–1 |
| $B_2O_3$ | 2.5–4 |
| $SiO_2$ | 0–3 |
| $Al_2O_3$ | 0.25–2 |
| $Ce_2O_3$ | 0.1–.3 | wherein the ratio of alkali oxide, be it sodium oxide or lithium oxide or a mixture of the two, is 1 mol to 2.5 to 4 mols of boron oxide for the borate glasses and 1 mole to 2.5 to 4 mols of combined boron oxide and silica for the borosilicate glasses. The ratio of boron oxide to silica for the borosilicate glasses is 1 mol $B_2O_3$ to 1.5 to 3 mols $SiO_2$.

The efficiency of the glasses of the invention as radiation detectors can be measured by their pulse heights and is dependent upon the particular glass composition. Replacement of sodium in the glasses in whole or in part with lithium ions will reduce the magnitude of the pulse height only slightly, whereas substitution with potassium ions will seriously reduce the pulse height. Similarly, the substitution of sodium with alkaline earth ions, as is common in glass formulation, will also lead to seriously lower radiation response efficiency of the glasses. The efficiency of the glasses can be determined by measuring their pulse heights against those obtained with the known thallium activated sodium iodide crystal of Hofstadter as the standard.

Substitution of the ions of zinc or cadium for the sodium ions in the above glasses will greatly reduce the scintillation pulse. Phosphorus ions substituted in the glasses for boron or silicon ions will produce quenching of the scintillation pulse.

The alumina is a most important component in the formulation of new glasses in that it improves the efficiency and increases the amount of cerium which can be dissolved in the glass. A glass having a mol ratio of $1Na_2O$ to $3B_2O_3$, for example, will dissolve only about .03 mol $Ce_2O_3$ and have a pulse height of only about 1.5% that of a thallium activated sodium iodide crystal under gamma radiation. By incorporation of 1.3 mols of alumina in this glass composition the pulse height is increased to 2.8%. With the use of greater amounts of cerium, the pulse height of this glass can be still further increased. Thus with the use of 1.3 mols of alumina and 0.1% cerous oxide in the glass, the pulse height is raised to 5%. The amount of alumina which can be employed in the glasses is limited to that which will not develop cloudiness in the glass. This upper limit for alumina in the glass compositions of the invention is about 2 mols.

The alkali oxide-boron oxide ratio in the glasses as stated above is 1:2.5 to 4. With higher boron contents in the glasses smaller pulse heights will be obtained. With lower boron contents great difficulty in obtaining clear glass bodies which do not devitrify has been encountered.

A typical borate glass of my invention is that of the composition 1 mol $Na_2O$, 3 mol $B_2O_3$, 1.3 mol $Al_2O_3$ and 0.1 mol $Ce_2O_3$. This is a clear glass which was found to have a pulse height of about 5% that of a thallium activated sodium iodide crystal for gamma rays and is also sensitive to neutrons. Both its neutron excited pulse and the ratio of its neutron excited pulse to its gamma ray excited pulse are superior to that of boron loaded liquids presently employed in time of flight spectroscopy.

The substitution of silica for part of the boron oxide to form the borosilicate glasses of the invention will not result in loss of pulse height. However, complete replacement of the boron oxide with silica in the above compositions will give poorer pulses. A typical borosilicate glass of the invention having the composition 1 mol $Na_2O$, 1 mol $B_2O_3$, 1.5 mols $SiO_2$, 1.3 mols $Al_2O_3$ and 0.1 mol $Ce_2O_3$ was found to have a higher pulse under gamma radiation than the corresponding borate glass described above, namely, 7% of that of thallium activated sodium iodide.

The glass compositions of the invention may be prepared by melting together the components as oxides, carbonates or oxalates under a reducing atmosphere. Preferred starting materials for the glasses are sodium or lithium carbonate, borax, boric oxide, aluminum hydroxide, sand or precipitated silicic acid, and cerous oxalate. The reducing atmosphere, as is known, is necessary in order to maintain the cerium in the trivalent state. Tetravalent cerium is known not to serve as an activator of luminescence. A convenient method for obtaining a suitable reducing atmosphere is to melt the starting materials in a platinum crucible which rests in an alumina crucible of about the same size, the assembly being placed on a bed of carbon contained in a larger covered alumina crucible. This arrangement protects the platinum crucible from contact with the carbon. The glass melt may be allowed to cool in the platinum crucible or poured into suitable molds to produce castings. The casting is made at temperatures close to the melting temperature which is in the neighborhood of about 1400° C. and in a non-oxidizing atmosphere. The glasses so produced are colorless and transparent. If the glasses are melted or cast in an oxidizing atmosphere they will be colored yellow to brown by the presence of tetravalent cerium. Even though all the cerium may not be oxidized to the tetravalent state, the blue luminescence of the trivalent cerium will be absorbed by the yellow or brown glass and very weak pulses or none at all will be obtained upon excitation with gamma rays or neutrons.

The glasses of the invention present the advantage of a lower cost material for the fashioning of scintillator-detectors than the previously available crystals and organic plastics. A further advantage is that they can be produced in any desired shape or thickness, whereas crystals cannot. Other advantages of the glasses are that they are rugged and harder and do not scratch as easily as any of the present crystals or plastics. Also, they are not hygroscopic, as are some of the best detector crystals. Another advantage is that the glasses may be fashioned into convenient assemblies by processing methods employing high temperatures which would destroy organic plastic scintillators.

An advantage of the glasses of the invention over any previously reported glasses or crystals is the high boron content which can be combined with a usable scintillation efficiency for neutrons. Glasses of the composition 1 mol $Na_2O$, 1.3 mol $Al_2O_3$, 3 mol $B_2O_3$ and 0.1 mol $Ce_2O_3$ have a pulse easily detected without coincidence counting techniques. Their very high boron content suggests that counting efficiencies for thermal neutrons of nearly 100% could be obtained from glasses prepared with the isotope $B^{10}$. The high cross-section of this isotope for thermal neutrons, as well as its efficient conversion of neutron energy to ionizing energy, is well known. The glasses of the invention provide the most concentrated source of this isotope combined with the transparency and efficiency required for use in neutron detection.

Since the invention may be variously embodied without departing from the spirit or scope thereof, it is intended that the specific embodiments of the invention appearing in the above description shall be taken as illustrative rather than in limitation except as may be required by the following claims.

What is claimed is:

1. A colorless and transparent glass containing trivalent cerium and scintillating in response to gamma rays and neutrons, said glass consisting essentially of sodium oxide, lithium oxide, alumina, boron oxide, silica and cerous oxide in the relative proportions of 1 mol $Na_2O+Li_2O$ in which the mol ratio $Na_2O:Li_2O$ is from 1–0 to 0–1, from 0.25–2 mol $Al_2O_3$, from 2.5–4 mol $B_2O_3+SiO_2$ in 6which the mol ratio $B_2O_3:SiO_2$ is from 1–0 to 1–3, and from 0.1–0.3 mol $Ce_2O_3$.

2. A colorless and transparent glass containing trivalent cerium and scintillating in response to gamma rays and neutrons, said glass consisting essentially of sodium oxide, alumina, boron oxide and cerous oxide in the relative proportions of 1 mol $Na_2O$, from 0.25–2 mol $Al_2O_3$, from 2.5–4 mol $B_2O_3$ and from 0.1–0.3 mol $Ce_2O_3$.

3. A colorless and transparent glass containing trivalent cerium and scintillating in response to gamma rays and neutrons, said glass consisting essentially of sodium oxide, alumina, boron oxide and cerous oxide in the relative proportions of 1 mol $Na_2O$, 1.3 mol $Al_2O_3$, 3 mol $B_2O_3$ and 0.1 mol $Ce_2O_3$.

4. A colorless and transparent glass containing trivalent cerium and scintillating in response to gamma rays and neutrons, said glass consisting essentially of sodium oxide, alumina, boron oxide, silica and cerous oxide in the relative proportions of 1 mol $Na_2O$, 1.3 mol $Al_2O_3$, 1 mol $B_2O_3$, 1.5 mol $SiO_2$ and 0.1 mol $Ce_2O_3$.

References Cited in the file of this patent

UNITED STATES PATENTS

| | | |
|---|---|---|
| 1,394,296 | Fisher | Oct. 18, 1921 |
| 1,545,509 | Montgomery et al. | July 14, 1925 |
| 2,068,801 | Hood | Jan. 26, 1937 |